(12) United States Patent
Starbile et al.

(10) Patent No.: US 9,388,903 B2
(45) Date of Patent: Jul. 12, 2016

(54) METHODS AND APPARATUSES FOR PRODUCING A COMPRESSION PACKING SEAL INCLUDING A DUAL-SIDED BRAIDED JACKET AND METHODS OF USING THE SAME

(71) Applicant: A.W. CHESTERTON COMPANY, Woburn, MA (US)

(72) Inventors: Paul Vincent Starbile, Winter Haven, FL (US); Henri V. Azibert, Windham, NH (US); Philip Michael Mahoney, Jr., Roslindale, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 0 days.

(21) Appl. No.: 14/038,235

(22) Filed: Sep. 26, 2013

(65) Prior Publication Data
US 2014/0084546 A1    Mar. 27, 2014

Related U.S. Application Data

(60) Provisional application No. 61/705,886, filed on Sep. 26, 2012.

(51) Int. Cl.
*F16J 15/22*    (2006.01)
*D04C 1/06*    (2006.01)
(Continued)

(52) U.S. Cl.
CPC . *F16J 15/22* (2013.01); *D04C 1/02* (2013.01); *D04C 1/06* (2013.01); *D04C 3/00* (2013.01); *D04C 3/02* (2013.01)

(58) Field of Classification Search
CPC .............. F16J 15/16; F16J 15/20; F16J 15/22
See application file for complete search history.

(56) References Cited

U.S. PATENT DOCUMENTS

| 1,086,240 A | 2/1914 | Strong |
| 1,171,090 A | 2/1916 | Cook |

(Continued)

FOREIGN PATENT DOCUMENTS

| DE | 575156 | 4/1933 |
| DE | 19749248 C1 | 9/1999 |

(Continued)

OTHER PUBLICATIONS

International Search Report and Written Opinion for Application No. PCT/US2012/057262, 20 pages, dated Feb. 22, 2013.

(Continued)

*Primary Examiner* — Gilbert Lee
(74) *Attorney, Agent, or Firm* — Nelson Mullins Riley & Scarborough LLP; Anthony A. Laurentano

(57) ABSTRACT

The present application pertains to a compression packing seal including a braided dual-sided jacket, methods for producing and using such a seal, and apparatuses suitable for producing such a seal. The compression packing seal is made up of a core and a jacket braided round the core. The jacket may include two or more different materials that are braided together in such a way that, in cross-section, the jacket has an asymmetrical configuration relative to a first axis that is substantially perpendicular to the longitudinal axis and is substantially perpendicular to a side of the jacket. Accordingly, when viewed in a cross-sectional plane, the jacket may expose substantially only a first material along a first side, and substantially only a second material along a second side.

23 Claims, 16 Drawing Sheets

(51) Int. Cl.
*D04C 3/00* (2006.01)
*D04C 1/02* (2006.01)
*D04C 3/02* (2006.01)

(56) References Cited

U.S. PATENT DOCUMENTS

| | | | |
|---|---|---|---|
| 1,325,950 A | 12/1919 | McClure |
| 1,930,766 A | 10/1933 | Moore |
| 2,562,262 A | 7/1951 | De Witt, Sr. |
| 2,667,684 A | 2/1954 | Boyer et al. |
| 2,827,319 A | 3/1958 | Pearce |
| 3,124,032 A | 3/1964 | Webster et al. |
| 3,196,737 A | 7/1965 | Wilkinson |
| 3,421,406 A | 1/1969 | Mitchell et al. |
| 3,438,841 A | 4/1969 | Zumeta |
| 3,646,846 A | 3/1972 | Houghton et al. |
| 4,100,835 A | 7/1978 | Kozlowski |
| 4,550,639 A | 11/1985 | Champlin |
| 4,559,862 A | 12/1985 | Case et al. |
| 4,672,879 A | 6/1987 | Champlin |
| 4,705,722 A | 11/1987 | Ueda et al. |
| 4,729,277 A | 3/1988 | Champlin |
| 4,802,398 A | 2/1989 | Champlin et al. |
| 4,936,186 A | 6/1990 | Sekido et al. |
| 4,949,620 A | 8/1990 | Swan et al. |
| 5,134,030 A | 7/1992 | Ueda et al. |
| 5,225,262 A | 7/1993 | Leduc |
| 5,240,769 A | 8/1993 | Ueda et al. |
| 5,339,520 A | 8/1994 | Leduc |
| 5,357,839 A | 10/1994 | Brookstein et al. |
| 5,370,405 A | 12/1994 | Ueda |
| 5,370,926 A | 12/1994 | Hopper |
| 5,388,498 A | 2/1995 | Dent et al. |
| 5,419,568 A | 5/1995 | Champlin |
| 5,522,603 A | 6/1996 | Naitou et al. |
| 5,549,306 A | 8/1996 | Ueda |
| 5,605,341 A | 2/1997 | Ueda |
| 5,609,708 A | 3/1997 | Suggs et al. |
| 5,687,974 A | 11/1997 | Wilkinson et al. |
| 5,794,504 A | 8/1998 | Starbile |
| 5,802,828 A | 9/1998 | Adorno |
| 6,270,083 B1 | 8/2001 | Hirschvogel et al. |
| 6,385,956 B1 | 5/2002 | Ottinger et al. |
| 6,572,117 B2 | 6/2003 | Fujiwara et al. |
| 7,086,650 B2 | 8/2006 | Fujiwara et al. |
| 8,297,624 B2 | 10/2012 | Ueda |
| 2004/0021274 A1 | 2/2004 | Ueda |
| 2015/0159757 A1* | 6/2015 | Kawasaki et al. ........ F16J 15/22 |

FOREIGN PATENT DOCUMENTS

| | | | |
|---|---|---|---|
| EP | 0476306 A2 | 3/1992 | |
| EP | 0750141 A1 | 12/1996 | |
| FR | 39305 | 7/1978 | |
| GB | 418271 A | 10/1934 | |
| GB | 1475102 A | 6/1977 | |
| JP | S46-30523 Y1 | 10/1971 | |
| JP | 60-252872 | 12/1985 | |
| JP | S60-260332 A | 12/1985 | |
| JP | S64-26069 A | 1/1989 | |
| JP | 03-209069 A | 9/1991 | |
| JP | 06129544 A * | 5/1994 | ............... F16J 15/22 |
| JP | 06129545 A * | 5/1994 | ............... F16J 15/22 |
| JP | 2007-198602 | 8/2007 | |
| KR | 10-1123530 | 3/2012 | |
| WO | 94/11555 A1 | 5/1994 | |
| WO | 0149911 A1 | 7/2001 | |

OTHER PUBLICATIONS

International Search Report and Written Opinion for Application No. PCT/US2013/061989, 12 pages, dated Feb. 21, 2014.

Supplementary Partial European Search Report, EP 12837380, dated Jun. 8, 2015, pp. 1-7.

* cited by examiner

METHODS AND APPARATUSES FOR PRODUCING A COMPRESSION PACKING SEAL INCLUDING A DUAL-SIDED BRAIDED JACKET AND METHODS OF USING THE SAME

BACKGROUND

In some mechanical fields, a seal must be effected between pieces of equipment. For example, one common application of sealing technology relates to creating a seal against a spinning shaft, such as the spinning shaft 10 depicted in FIG. 1A. As shown in FIG. 1B, it may be necessary to create a seal around the shaft 10 in order to prevent a fluid 15 present at one side of the shaft 10 from leaking around the shaft 10.

Accordingly, stuffing box 20 may be positioned around the shaft 10. The stuffing box 20 may include a packing material, referred to herein as a compression packing seal 30, which is wrapped around the rotating shaft and provides an interface and sealing surface between the rotating shaft 10 and the stuffing box 20. Thus, the fluid 15 is prevented from penetrating past the compression packing seal 30 and leaking to the atmosphere.

In some situations, a lantern ring 40 may be in communication with a shaft in the stuffing box 20. The lantern ring 40 may include a hole for delivering a fluid, such as a lubricating oil, from the channel to the rotating shaft 10.

The compression packing seal 30 may be in the form of a braided material, and is commonly square or round when viewed in cross section (although the compression packing seal 30 may be provided in a variety of cross-sectional shapes). The compression packing seal 30 may be cut to an appropriate size and wrapped around the shaft 10 to form a ring. Multiple rings of compression packing seal 30 may be provided along the length of the shaft 10 in order to provide a seal around the shaft 10. A packing gland 50 may be used to secure the compression packing seal(s) 30 inside the stuffing box 20 and compress the compression packing seal(s) around the shaft 10.

Typically, in order to form the compression packing seal 30, one or more materials are braided together in a braid pattern, such as a square pattern or a corner-reinforced pattern. The braiding patterns are realized by moving two or more materials along a series of material paths in an x-y plane, which builds up a braided structure that increases in size in a z-plane. FIGS. 2A-2D depict common braiding patterns (in the x-y plane) used in conventional compression packing seals.

For example, FIG. 2A depicts a braid known as a square braid, formed by braiding two materials along a two-tracked set of material paths 60. The result is a braided structure 70, shown in side-view in FIG. 2B, where the two materials alternate at each corner of the square.

FIG. 2C depicts a 3-track interbraided square structure, wherein three materials are braided along a three-tracked set of material paths 80. The result is a braided structure 90, shown in side-view in FIG. 2D, where the three materials alternate on each side of the square. FIG. 2E depicts a three-dimensional side-view perspective view of the braided structure 90 of FIG. 2D.

Similarly, FIG. 2F depicts a 4-track interbraided square structure, wherein one to four materials are braided along a four-tracked set of material paths 100 (most commonly, one material is used on all four paths). The result is a braided structure 110, shown in FIG. 2G, where the one to four materials alternate on each side of the square.

FIG. 2H depicts a special case of the 4-track interbraided square structure of FIG. 2F. In FIG. 2H, a four-tracked set of material paths 120 is provided. In this example, two materials are used in the four-tracked material paths. That is, the same material is repeated on two "internal" material paths, and a different material is repeated on the "external" material paths. Thus, the first material is present along the sides of the compression packing seal, while the second material is present in the corners of the compression packing seal, as shown in FIG. 2I.

Such a structure may be useful, for example, if the corners of the compression packing seal are expected to receive more wear than the sides. Thus, a sturdier material may be used to reinforce the corner sections, while a less expensive or more lubricating material may be used to fill in the sides.

FIG. 2J depicts an example of a braid-over-braid pattern. Specifically, the braid of FIG. 2J is formed by wrapping two symmetrical overbraids around a core.

FIG. 2K depicts a combination "end ring" useful for anti-extrusion purposes. For example, the end ring includes exterior braided rings (formed, e.g., from braided carbon fiber) and a series of interior rings. The interior rings may be, for example, molded graphite. In FIG. 2K, the interior rings are made of different materials, although this is not necessarily always the case. The exterior rings are useful for their anti-extrusion properties, while the interior rings provide a sealing surface.

A variety of types of materials may be used to form the compression packing seal, and properties of the stuffing box/shaft/fluid system may affect the requirements of the packing seal and therefore the materials employed in the compression packing seal.

However, the properties of the stuffing box/shaft/fluid system may not be evenly distributed, qualitatively or quantitatively, throughout the system. For example, the side of the packing seal that faces the shaft may be exposed to a large amount of wear-and-tear due to the rotation of the shaft, while the opposite side (which faces the stuffing box) may be subjected to significantly reduced stress. Further, the side of the seal in the corner of the stuffing box nearest to the fluid that is sealed against may need to have a greater resistance to extrusion, because at this location the seal must effect a seal with a gap between the bottom of the stuffing box and the shaft. There is not an extrusion concern on intermediate rings of the seal because there is not a need to seal across such a gap.

The conventional braiding patterns described above each suffers from shortcomings in addressing the above-noted problem. More specifically, the different materials of the braided structures tends to be distributed evenly around the entire braided structure. For example, as shown in the four-tracked structure 100 of FIG. 2C, each side of the 4-track interbraided square structure exposes all of the materials. Thus, it is difficult to deploy the 4-track interbraided structure so that only certain materials are exposed to certain conditions. For example, it is not possible for the 4-track interbraided structure to present one material chosen for durability on the side facing the shaft 10, and another inexpensive material on the side facing the stuffing box 20. Instead, all four materials are present facing every direction.

SUMMARY

The present application addresses shortcomings of existing compression packing seals with respect to the above-noted uneven distribution of stresses throughout the equipment/seal system.

In exemplary embodiments, a compression packing seal having a dual-sided braided jacket and an inner core is provided. The jacket is made up of at least a first material and a second material different than the first material. The first material is braided with the second material to form the jacket around the core. The first material and the second material are disposed relative to each other such that, in cross-section, the jacket has an asymmetrical configuration relative to a first axis that is substantially perpendicular to the longitudinal axis and is substantially perpendicular to a side of the compression packing seal.

Exemplary embodiments also provide methods for producing the compression packing seal. At least a first material and a second material may be provided to a plurality of carriers following two semi-circular material paths that interlock at two different locations. The interlocking may be done in such a manner so that the first material and the second material are disposed relative to each other such that, in cross-section, the compression packing seal has an asymmetrical configuration relative to a first axis perpendicular to the longitudinal axis. The first material and the second material may be braided around the inner core.

Exemplary embodiments further provide apparatuses for producing a compression packing seal including a braided dual-sided jacket and an inner core. The apparatus may include a first set of horn gears for moving the first material and a second set of horn gears for moving the second material. The first set of horn gears and the second set of horn gears may abut in two different locations to create first and second semi-circular material paths. The apparatus may further include one or more carriers for transferring the first material among the first set of horn gears and for transferring the second set of materials among the second set of horn gears. The carriers may braid the first and second materials at the two different locations to braid the first and second materials around an inner core. The apparatus may further include a mechanism for moving the inner core through the braided first and second materials. The material paths may be defined so that the carriers do not collide with one another as they carry and braid the materials.

In some embodiments, the compression packing seal may be employed by placing the compression packing seal into a stuffing box. The seal may be provided around a shaft. Multiple types of compression packing seals may be used in conjunction with a single stuffing box, or the same type of compression packing seal may be used repeatedly, in the same or differing configurations.

DETAILED DESCRIPTION

Existing compression packing seals are ill-suited to the uneven distribution of stresses and other factors relating to mechanical equipment. Conventional braiding techniques allow for different material types to be mixed, but typically only in symmetrical braiding patterns. Accordingly, using conventional braiding techniques it is not possible to (for example) produce a braided compression packing seal with a first material substantially entirely on one side (e.g., substantially about a continuous 50% of the surface area of the seal) and a second material substantially entirely on a different side (e.g, substantially the continuous 50% of the surface area of the seal opposing the first side).

One possible solution is to separately braid two different compression packing seals, and then secure the two different compression packing seals together (e.g., with an adhesive). However, such a solution is problematic for a number of reasons. For example, this solution requires that two braided structures be created. Thus, the time required to braid the materials, and the wear-and-tear on the braiding machinery, is double what it would otherwise be if the braid consisted of a single material. Furthermore, because the different packing seals are merely secured together with adhesive, the resulting packing material is not as strong as a packing in which the constituent materials are braided together.

Another solution, as discussed in U.S. patent application Ser. No. 13/627,373, entitled "Methods and Apparatuses for Producing a Braided Dual-Sided Compression Packing Seal and Methods of Using the Same" and filed on Sep. 26, 2012 (the contents of which are incorporated herein by reference), produces a braided compression packing seal with asymmetrical properties in which the constituent materials are braided together. The techniques discussed in the '373 application are advantageous, for example, because the seal can be produced using a single pass on a single braiding machine.

Figure 1A:
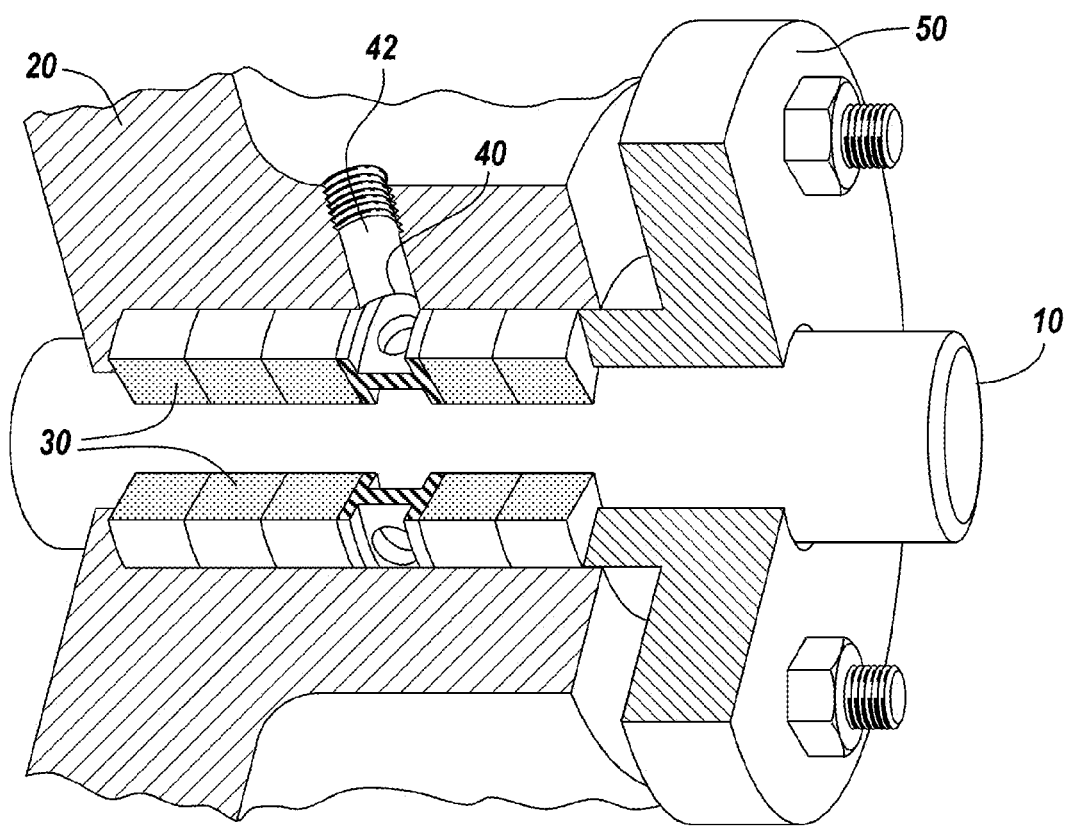
FIG. 1A depicts an exemplary conventional stuffing box and compression packing seal used to secure against a rotating shaft.
Figure 1B:
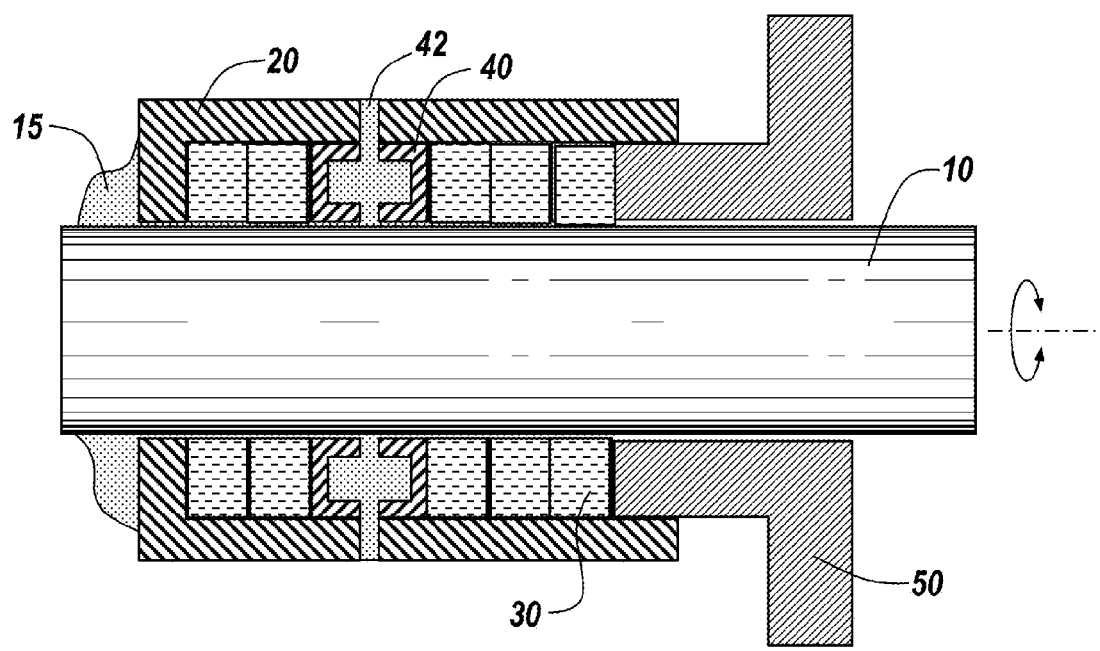
FIG. 1B is a cross-sectional view of the stuffing box and rotating shaft of FIG. 1A.
Figure 2A:
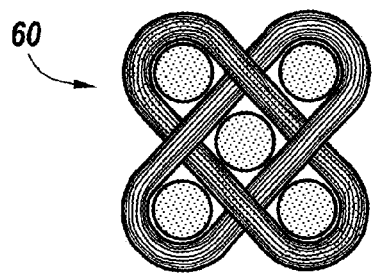
FIG. 2A depicts an example of a braiding pattern for a conventional 2-tracked square braid.
Figure 2B:
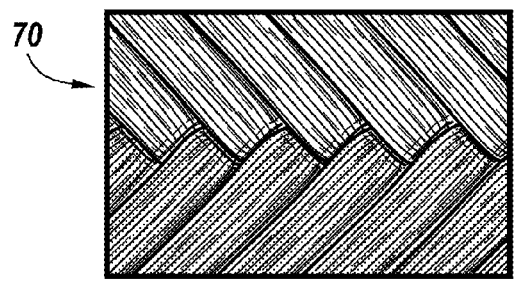
FIG. 2B depicts an example of one side of a square braid braided according to the pattern depicted in FIG. 2A.
Figure 2C:
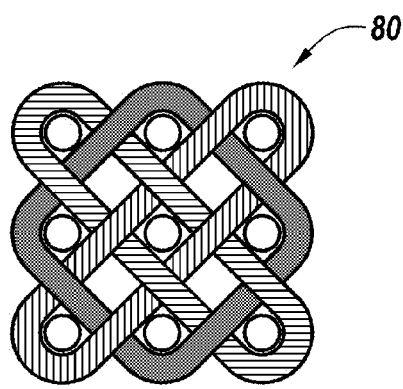
FIG. 2C depicts an example of a braiding pattern for a conventional 3-tracked square interbraid.
Figure 2D:
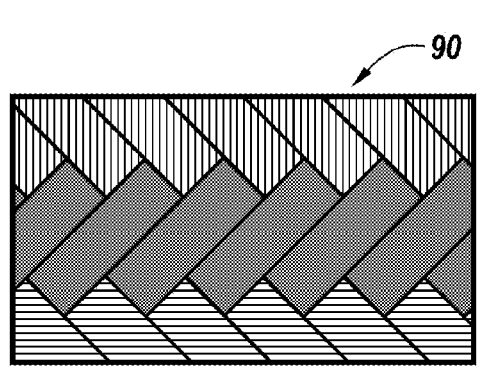
FIG. 2D depicts an example of one side of a square braid braided according to the pattern depicted in FIG. 2C, shown in a two-dimensional perspective.
Figure 2E:
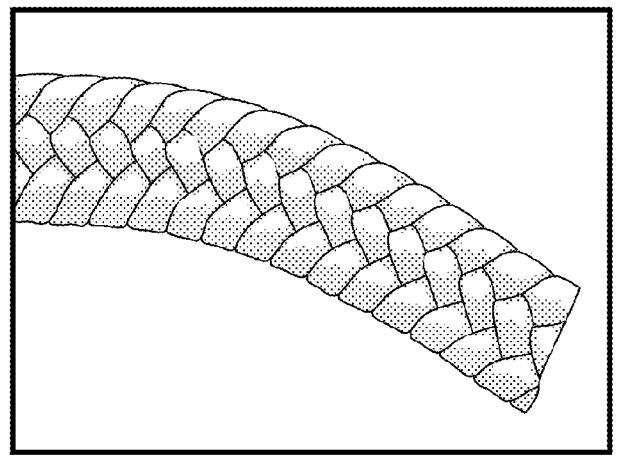
FIG. 2E depicts an example of one side of a square braid braided according to the pattern depicted in FIG. 2C, shown in a three-dimensional perspective.
Figure 2F:
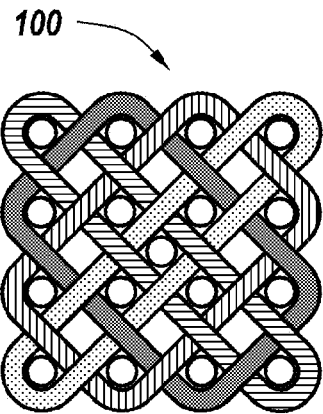
FIG. 2F depicts an example of a braiding pattern for a conventional 4-tracked square interbraid.
Figure 2G:
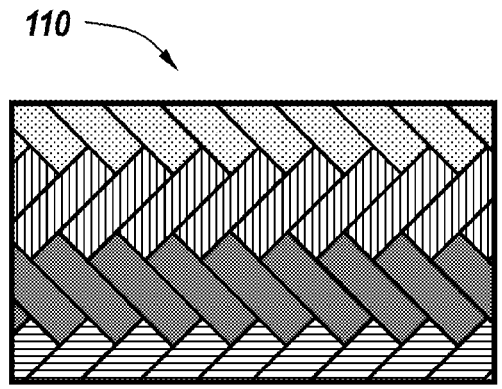
FIG. 2G depicts an example of one side of a interbraid braided according to the pattern depicted in FIG. 2F.
Figure 2H:
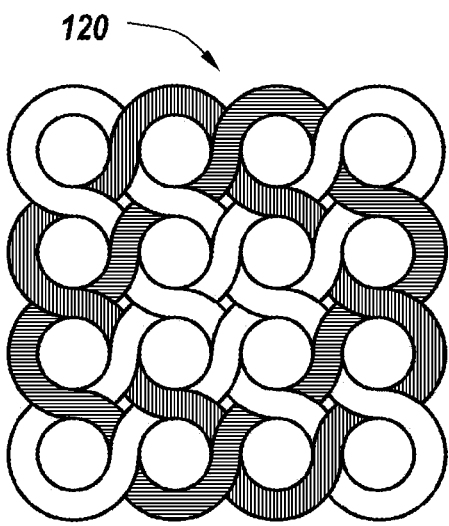
FIG. 2H depicts an example of a braiding pattern for a conventional 4-tracked square corner-reinforced interbraid.
Figure 2I:
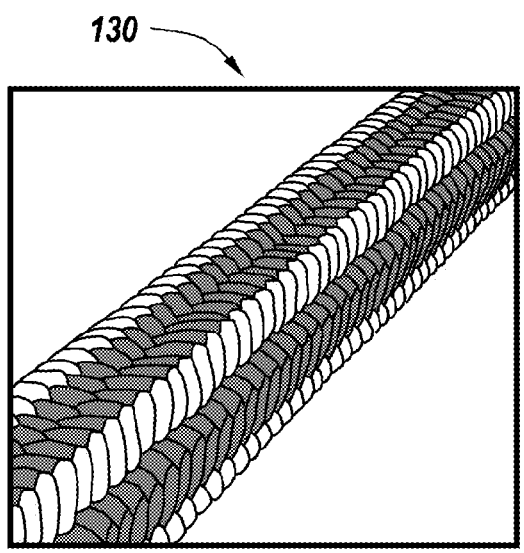
FIG. 2I depicts an example of two sides of a square corner-reinforced interbraid braided according to the pattern depicted in FIG. 2H, shown in a three-dimensional perspective.
Figure 2J:
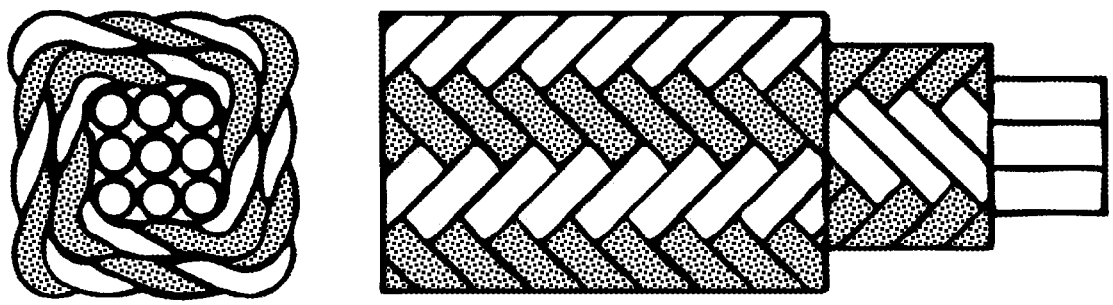
FIG. 2J depicts an example of a conventional braid-over-braid pattern.
Figure 2K:
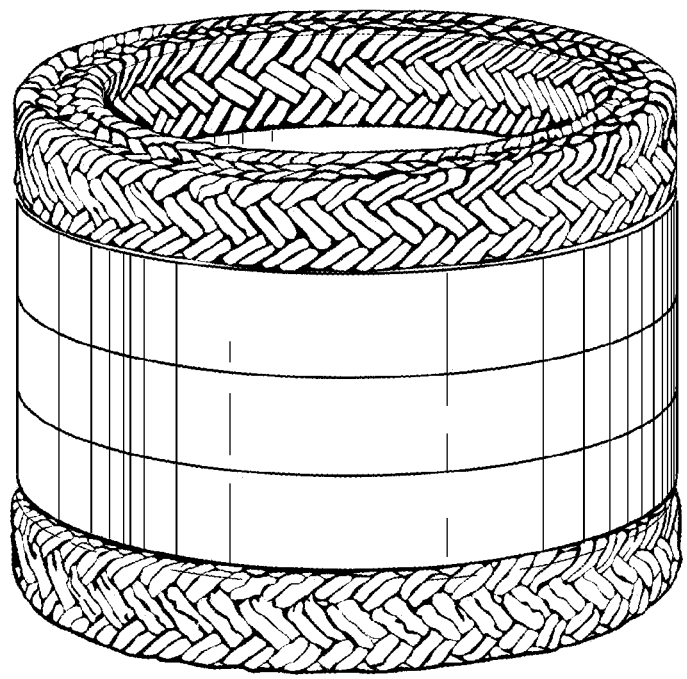
FIG. 2K depicts a combination "end ring."
Figure 3:
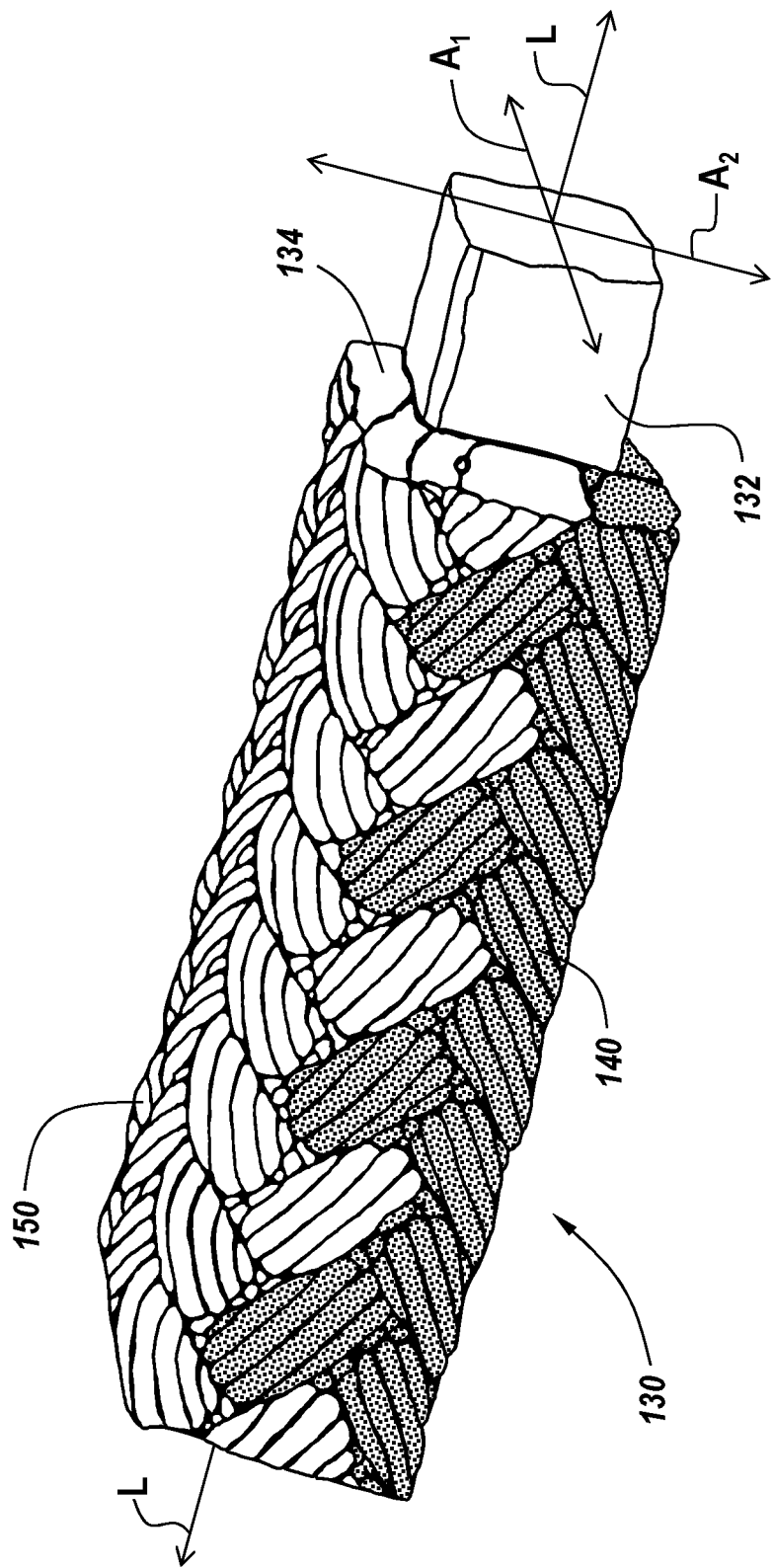
FIG. 3 depicts a side view of a compression packing including an inner core and a braided dual-sided jacket according to an exemplary embodiment of the present invention.

In some circumstances in which a dual-sided compression packing seal may be useful, it may be further advantageous for the dual-sided braided portion of the compression packing seal to be in the form of a braided dual-sided jacket, which is braided around an inner core, as shown in FIG. 3. For example, by providing an inner-core of a low-cost material, the overall cost of the compression packing seal may be further reduced. Alternatively, inner cores providing desired structural characteristics (e.g., providing a certain shape for the overall compression packing seal, such as a triangular or polygonal shape) may be employed, thereby imparting those desirable structural characteristics to the compression packing seal.

As shown in FIG. 3, exemplary embodiments provide a dual-sided compression packing seal 130. The dual-sided compression packing seal comprises an inner core 132 and a braided dual-sided jacket 134.

A longitudinal axis "L" extends through the center of the compression packing seal 130 along a length of the compression packing seal. A first axis "$A_1$" is substantially perpendicular to the longitudinal axis L and is substantially perpendicular to a side of the compression packing seal 130. It should be noted that, because the inner core 132 and the jacket 134 extend along the length of the compression packing seal 130, the above axes and dimensions are equally applicable to the inner core 132 and jacket 134 as they are to the overall compression packing seal 130.

The jacket 134 of the present application may be made up of at least a first material 140 and a second material 150, which may be braided together in such a way that, when viewed in cross-section, the jacket 134 has an asymmetrical configuration relative to the first axis $A_1$. That is, the first material 140 is disposed substantially completely along one exterior side of the compression packing seal 130 (the bottom of the compression packing seal 130 in FIG. 3), while the second material 150 is disposed substantially completely along an opposing exterior side (the top in FIG. 3) of the compression packing seal 130.

On intermediate sides of the jacket 134 between the opposing sides (e.g., the side facing the reader in FIG. 3, and the unpictured side which faces away from the reader in FIG. 3), the first material 140 and the second material 150 may both be present, preferably each on a continuous region of the intermediate side, each extending from the opposed exterior side to substantially the one-third of the length of the intermediate side, as shown in FIG. 3. In the central one-third of the length of the intermediate side, the first material 140 and the second material 150 may alternate in the manner depicted in FIG. 3.

Thus, over the total surface area of the jacket 134, each of the first material 140 and the second material 150 may account for approximately 50% of the surface area, with the first material 140 accounting for substantially the entire bottom 33% (when viewed in cross-section) and the second material 150 accounting for substantially the entire top 33% (when viewed in cross section).

One can further define a second axis $A_2$ perpendicular to the first axis $A_1$ such that, in cross-section, the jacket 134 has a symmetrical configuration relative to the second axis $A_2$.

Stated differently, the jacket 134 of the compression packing seal 130 may have a plurality of sides, and the jacket 134 (and by extension the compression packing seal 130) presents an asymmetrical configuration when viewed in a plane that is perpendicular to the sides. For example, in FIG. 3, the jacket 134 is asymmetrical when considered from top to bottom, if folded over the axis $A_1$.

The first material 140 and the second material 150 may be selected for any number of different properties. Some exemplary considerations for the first material 140 include, but are not limited to: the first material 140 may be selected to have a higher lubricity than the second material 140; the first material 140 may be selected to have a higher sealability than the second material 150; the first material 140 may be selected to have a different construction than the second material 150 (such as a continuous fiber construction versus a staple fiber construction); the first material 140 may be selected to have a higher extrusion resistance than the second material 150; and the first material 140 may be selected to have a higher thermal conductivity than the second material 150. The first material 140 may be made up of, for example, carbon, PTFE, a para-aramid synthetic fiber, polybenzimidazole fiber (PBI), or 95%+ carbon assay.

Similarly, the second material 150 may be selected to have a lower cost than the first material 140, a higher malleability than the first material 140, a higher modulus than the first material 140, or less PTFE content than the first material 140. The second material 150 may be made up of, for example, acrylic, rayon, carbon, graphite, or fiberglass.

The first and second materials 140, 150 may be selected and deployed based on different applications of the compression packing seal 130. Advantageously, the properties of both the first and second materials 140, 150 may be leveraged in a single unitary compression packing seal 130 which can be braided in a single process on a single machine.

In one example, the first material 140 may be placed against an interior wall of a stuffing box 20. The second material 150 may be placed against the rotating shaft 10. Thus, it may be desirable to select, for the second material 150, a strong material that is more expensive as the first material 140. Because the first material 140 may experience less wear-and-tear than the second material 150 in this configuration, it may be desirable to utilize a less expensive material for the first material 140 in order to lessen the cost of the compression packing seal 130 overall.

Figure 4A:
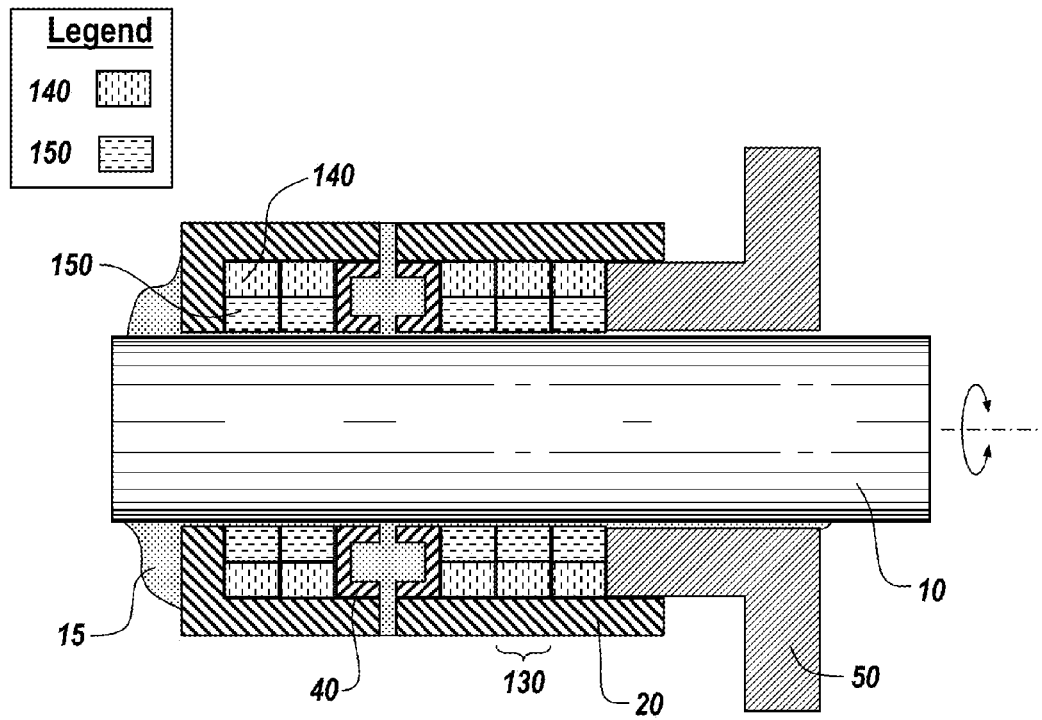
FIG. 4A depicts a first exemplary configuration for an exemplary compression packing seal inside a stuffing box.

For instance, such a combination of materials may be used in a configuration similar to the one depicted in FIG. 4A. As shown in FIG. 4A, the first material 140 may be selected to have a lower cost than the second material 150. The first material 140 may, in addition or alternatively, be more malleable than the second material 150, in order to provide a better static seal against the (non-rotating) stuffing box 20. The first material 140 may also be selected to have a relatively high modulus for compression control, or may be selected to have a minimal polytetrafluoroethylene (PTFE) content to thereby reduce the PTFE content in the overall construction of the compression packing seal 130.

The second material 150 of the compression packing seal 130 may be provided on a side of the compression packing seal 130 that faces the shaft 10. The second material 150 in this case may be selected to have a higher lubricity and/or higher thermal conductivity than the first material 140.

Figure 4B:
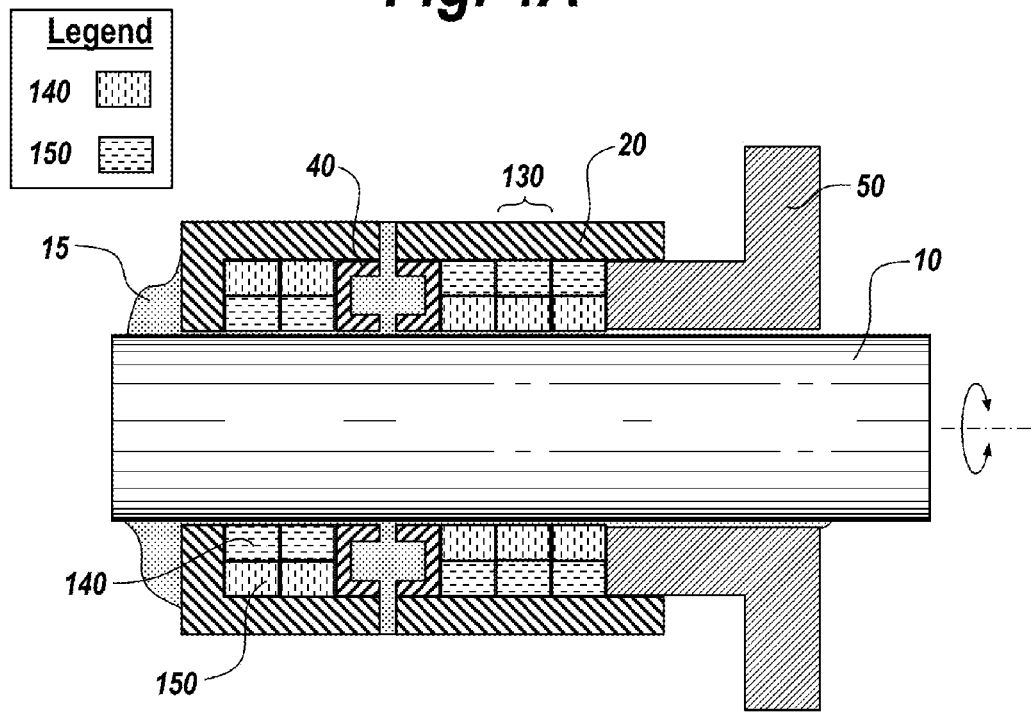
FIG. 4B depicts a second exemplary configuration for an exemplary compression packing seal inside a stuffing box.

In another example depicted in FIG. 4B, different materials may be selected, and the compression packing seals may be deployed in different configurations, based on the side of the lantern ring 40 on which the compression packing seal is used. The compression packing seal 130 may include a first material 140 selected for higher lubricity, higher thermal conductivity, or higher sealability than the second material 150. The second material 150, in turn, may be selected to have a higher strength or greater abrasion resistance than the first material 140. On the side of the lantern ring 40 closest to the fluid 15, the second material 150 may face the shaft 10 in order to provide a higher-strength material against the fluid 15, which may be abrasive. On the side of the lantern ring 40 closest to the packing gland 50, the first material 140 may face the shaft in order to provide better sealability and prevent the fluid 15 from leaking to the atmosphere.

Figure 4C:
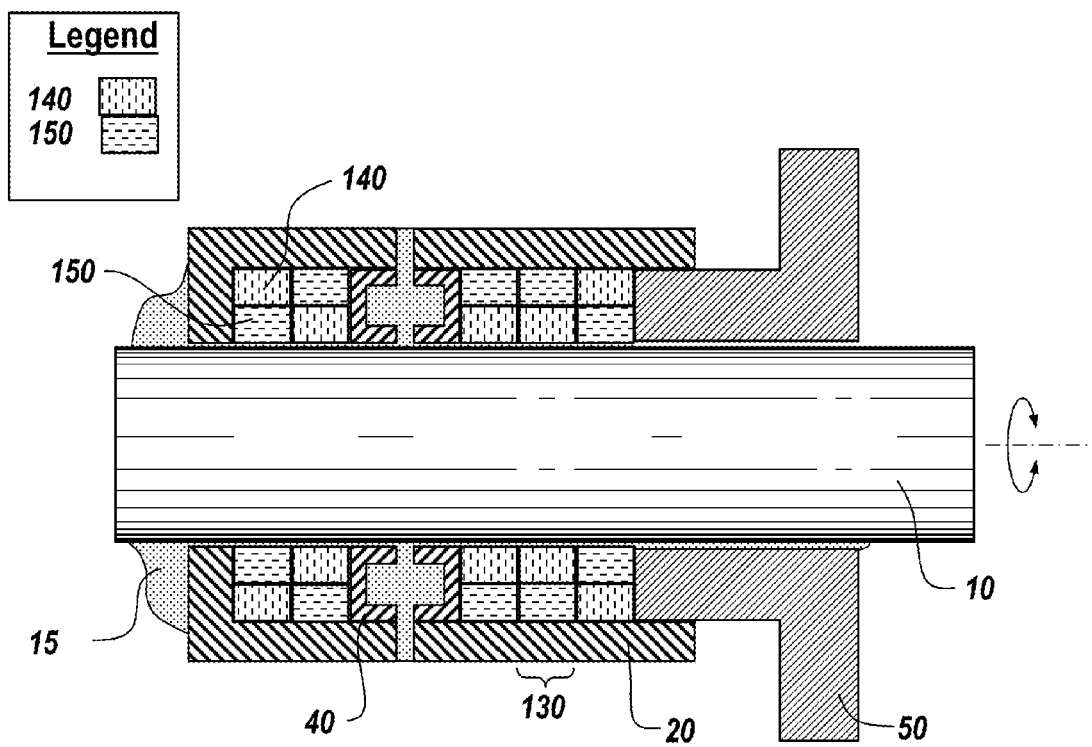
FIG. 4C depicts a third exemplary configuration for an exemplary compression packing seal inside a stuffing box.
Figure 4D:
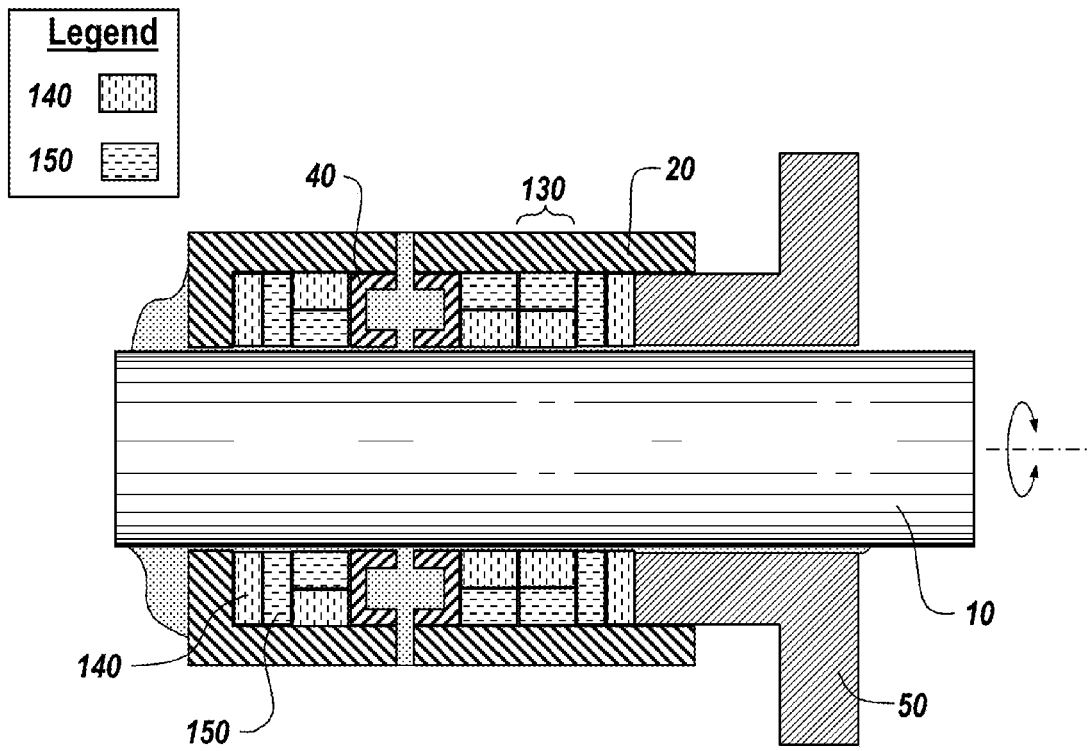
FIG. 4D depicts a fourth exemplary configuration for an exemplary compression packing seal inside a stuffing box.

Further examples are shown in FIGS. 4C and 4D. In FIG. 4C, the first material 150 faces the shaft at the ends of the stuffing box 20, providing a higher strength material in the corner gaps to prevent extrusion. The second material 140 may be selected to have improved sealing properties, thus providing a strong sealing surface in each location where extrusion is not a significant factor. FIG. 4D depicts a similar anti-extrusion configuration in which the compression packing seals 130 on either end of the rotating shaft are rotated 90 degrees from the other compression packing seals 130. In this way, the anti-extrusion properties of the first material 140 can be leveraged precisely where these properties are most helpful, while still using some of the sealing properties of the second material 150 of these particular compression packing seals 130.

One of ordinary skill in the art will recognize that the above properties, materials, and configurations are exemplary only, and that other types of materials, properties, and configurations may be selected based on the specific application.

Figure 5A:
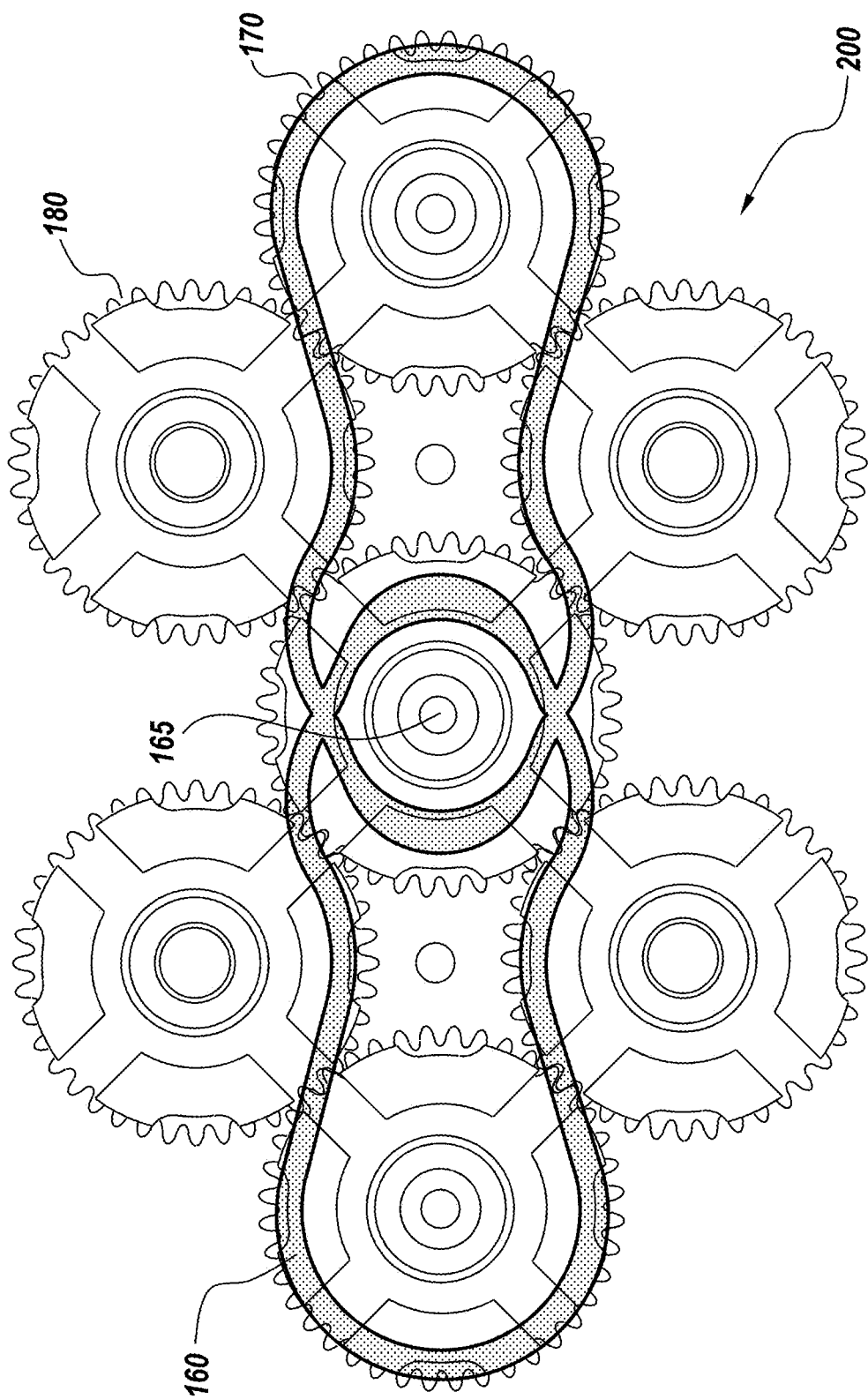
FIG. 5A depicts an exemplary braiding path layout in a cross-over section of a braiding apparatus suitable for use with exemplary embodiments of the present invention to produce a jacket for a compression packing seal.

FIG. 5A depicts material paths that may be used to braid the first and second materials 140, 150 of the jacket 132 of the compression packing seal. The material paths of FIG. 5A are overlaid on horn gears that may be used to define the material paths. Thus, one of ordinary skill in the art will recognize that the material paths depicted in FIG. 5A may be defined by material tracks for use with a braiding apparatus, such as the apparatus shown in FIGS. 6A-6B. As described in more detail below, one or more carriers may carry the first and second materials 140, 150 along the material paths using the tracks in order to braid the first and second materials 140, 150 together.

When braided using the material paths of FIG. 5A, the jacket may include the first material 140 and the second material 150 disposed relative to each other such that, in cross-section, the compression packing seal 130 has an asymmetrical configuration relative to a first axis $A_1$ that is substantially perpendicular to the longitudinal axis L and is substantially perpendicular to a side of the compression packing seal.

The material paths may include a first material path 160 that is substantially semicircular in shape and a second material path 170 that is semicircular in shape. The first material 140 and the second material 150 may be braided or interlocked at two or more points (e.g., the location 165) where the material paths abut or interconnect in order to form the jacket 132 of the compression packing seal 130.

The material paths 160, 170 may be defined by the tracks of a braiding apparatus, wherein carriers 190 are moved along the tracks by a set of horn gears 180. The locations for the horn gears 180 are shown in broken lines in FIG. 6B.

The horn gears 180 may include a first set of horn gears for moving the first material and a second set of horn gears for moving the second material. The first set of horn gears may correspond to the horn gears that define the first material path 160, and the second set of horn gears may correspond to the horn gears that define the second material path 170. The first set of horn gears and the second set of horn gears abut in two different locations 165 to create first and second semicircular material paths.

Figure 5B:
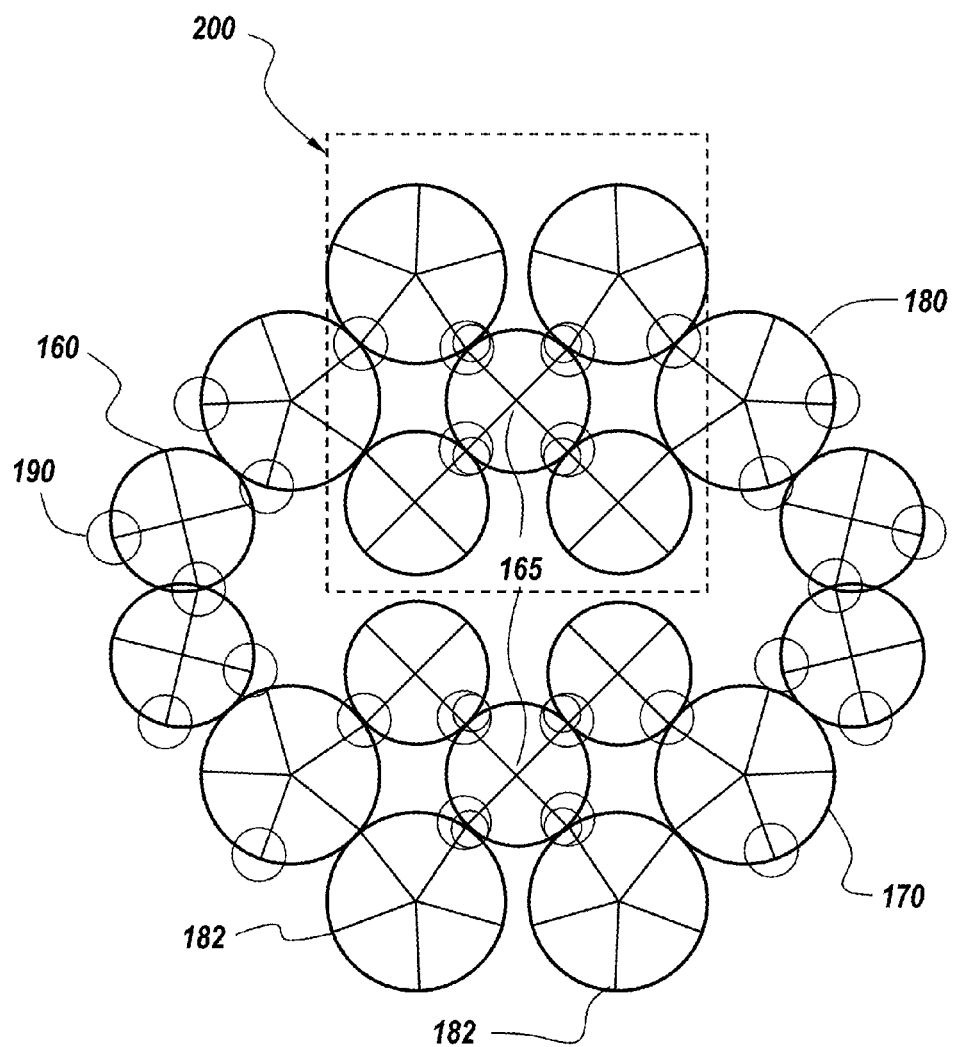
FIG. 5B depicts an exemplary horn gear configuration for a braiding device that realizes the uses the cross-over section of FIG. 5A.

Each of the horn gears 180 may include one or more slots 182 for receiving the above-mentioned carriers 190 (the carriers 190 are represented in FIG. 5B as circles on the slots 182). The slots 182 may be sized and configured to receive the carriers 190. Furthermore, both the horn gears 180 and the slots 182 may be sized and configured to prevent the carriers 190 from colliding as the braiding apparatus moves the carriers 190 to braid the first and second materials 140, 150 to form the jacket 132 around the inner core 134. For example, each of the horn gears 180 in the changeover region may include five slots 182 for receiving the carriers, which in some embodiments (such as the one depicted in FIG. 6B) prevents the carriers from colliding.

Figure 6A:
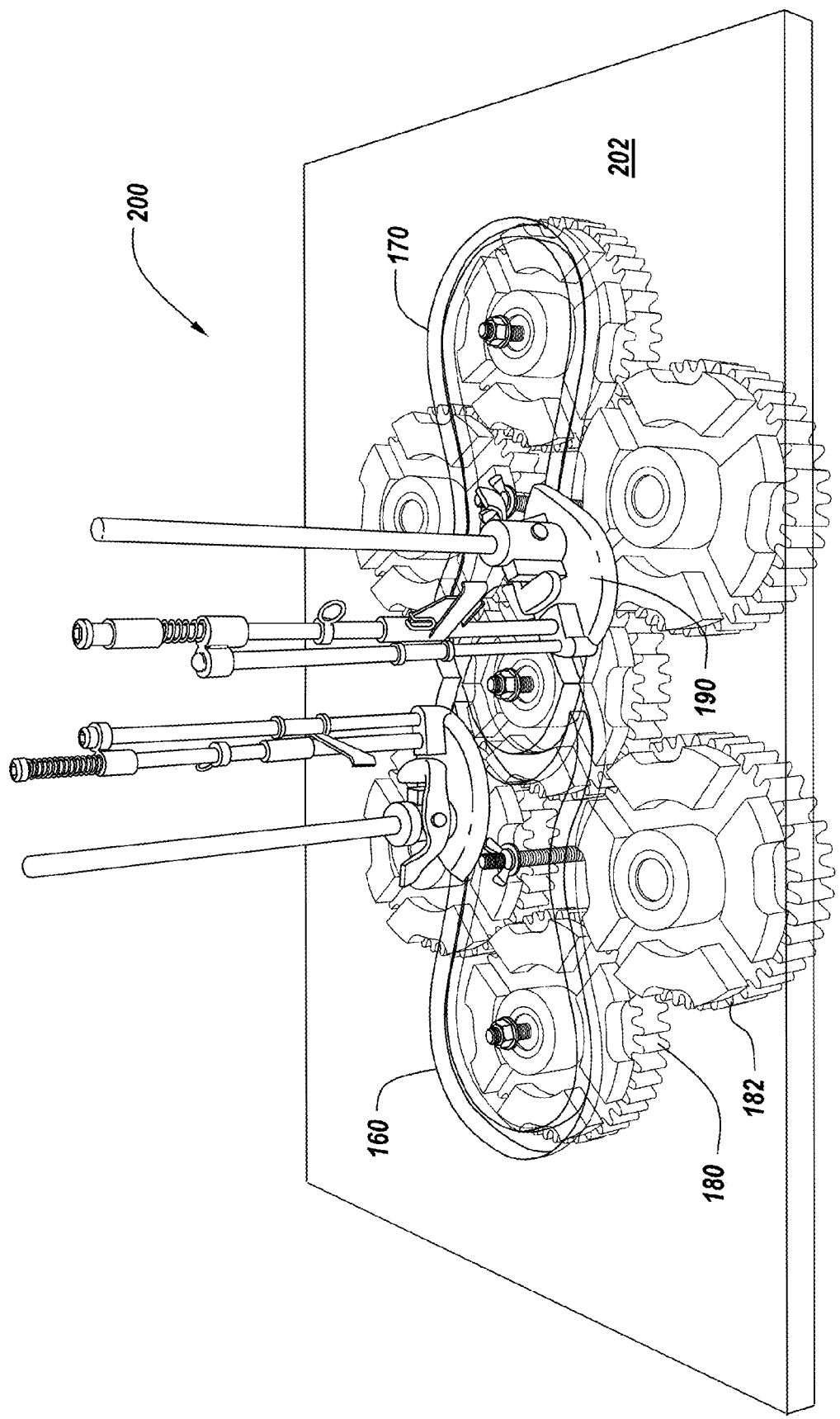
FIG. 6A depicts an exemplary portion of a braiding apparatus suitable for realizing the portion of the braiding path layout of FIG. 5A at which the material paths abut and interconnect.

For example, FIG. 6A shows a portion 200 of an apparatus for braiding the first and second materials 140, 150 to form the jacket 132. The portion 200 specifically represents the horn gears 180 at the location where the material paths 160, 170 abut each other and interconnect to braid the first material 140 with the second material 150.

Figure 6B:
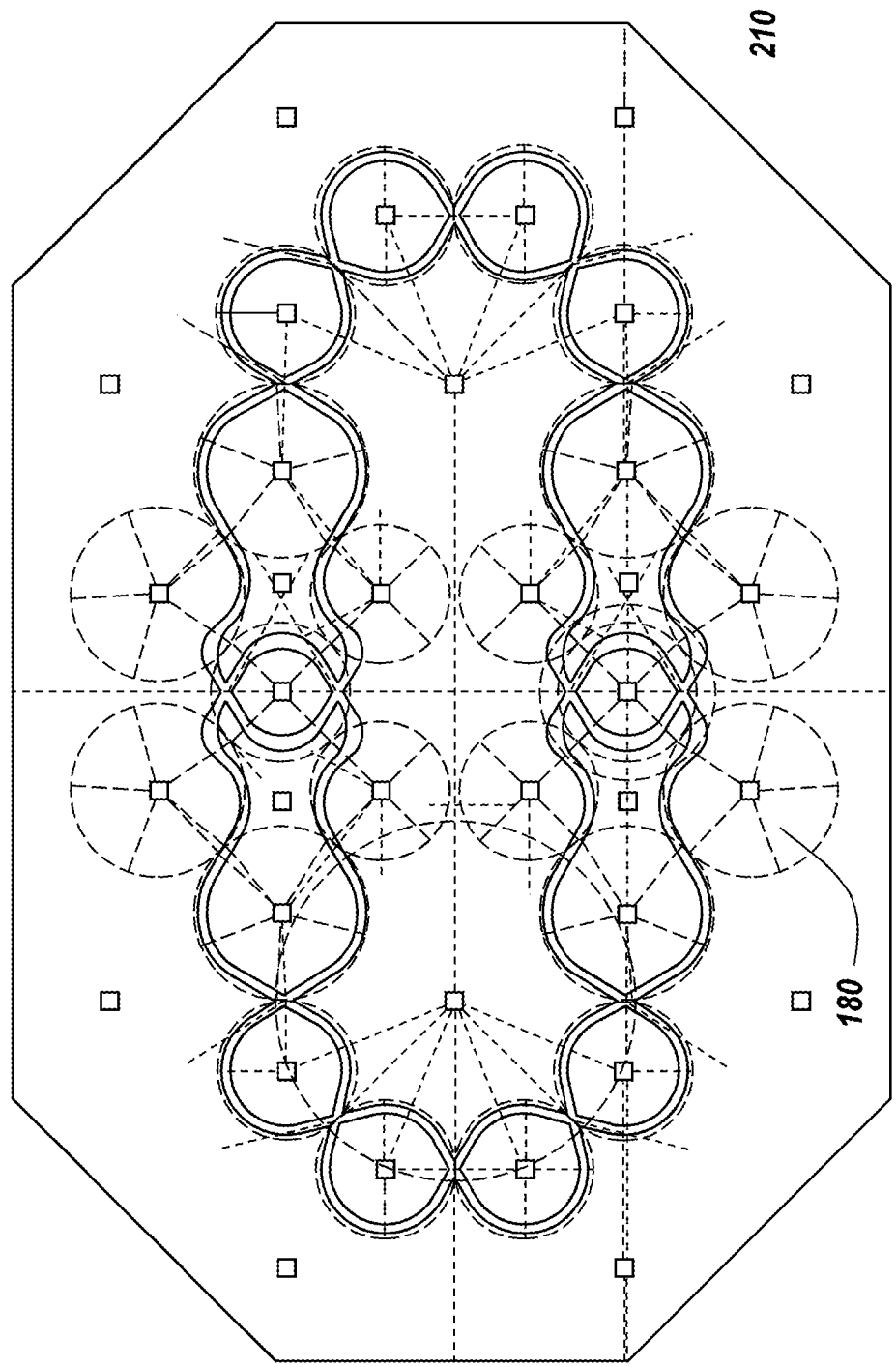
FIG. 6B depicts the material paths for an exemplary braiding apparatus including the portion of FIG. 6A.

FIG. 6B shows an upper plate of the apparatus, including the portion 200, in more detail. A plate 202 may cover the horn gears 180, and the material paths 140, 150 may be defined as cut-outs in the plate 202.

Figure 6C:
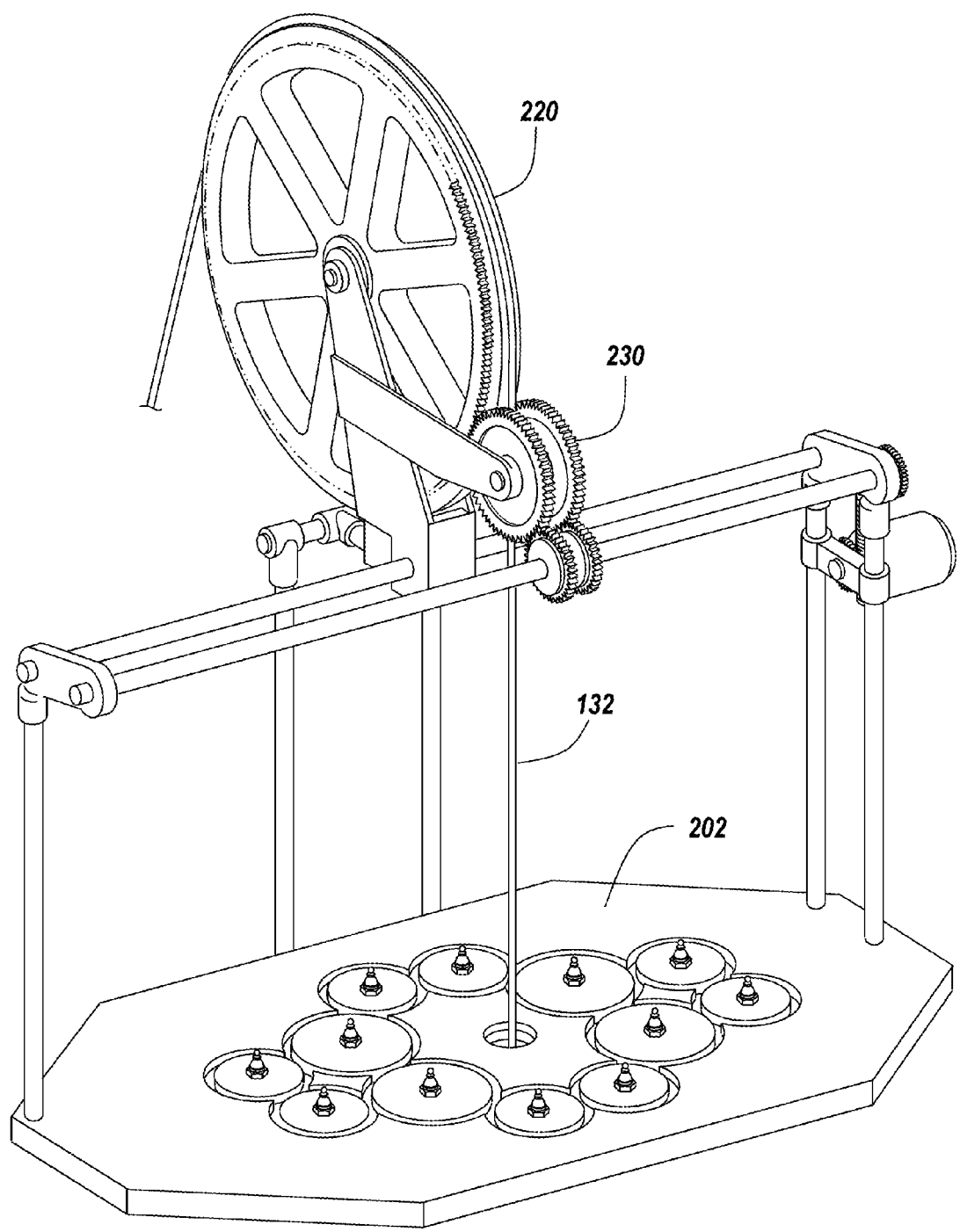
FIG. 6C depicts an exemplary braiding apparatus suitable for realizing the braiding path layout depicted in FIG. 5B for producing a braided dual-sided jacket, including a mechanism for moving an inner core through the braided dual-sided jacket.

Furthermore, as shown in FIG. 6C, a mechanism 220 for moving the inner core 134 through the braided first and second materials 140, 150 forming the jacket 132 may also be provided. The mechanism 220 may be, for example, a takeoff wheel which pulls (or pushes) the inner core 134 through the braided jacket 132 as the jacket 132 is braided around the core 134. The mechanism 220 may move the inner core 134 through the jacket 132 at a predetermined speed that may be based on the speed at which the apparatus 210 braids the first and second materials 140, 150 to form the jacket 132. For example, the mechanism 220 may have its speed controlled through a gearing mechanism 230 which moves the mechanism 220 at a predetermined speed. The gearing mechanism 230 may be connected to one or more of the horn gears 180 that braid the jacket 132. In this way, the speed of the horn gears 180 performing the braiding of the jacket 132 may be used to control the speed of the gearing mechanism 230 which controls the speed of the mechanism 220.

Figure 6D:
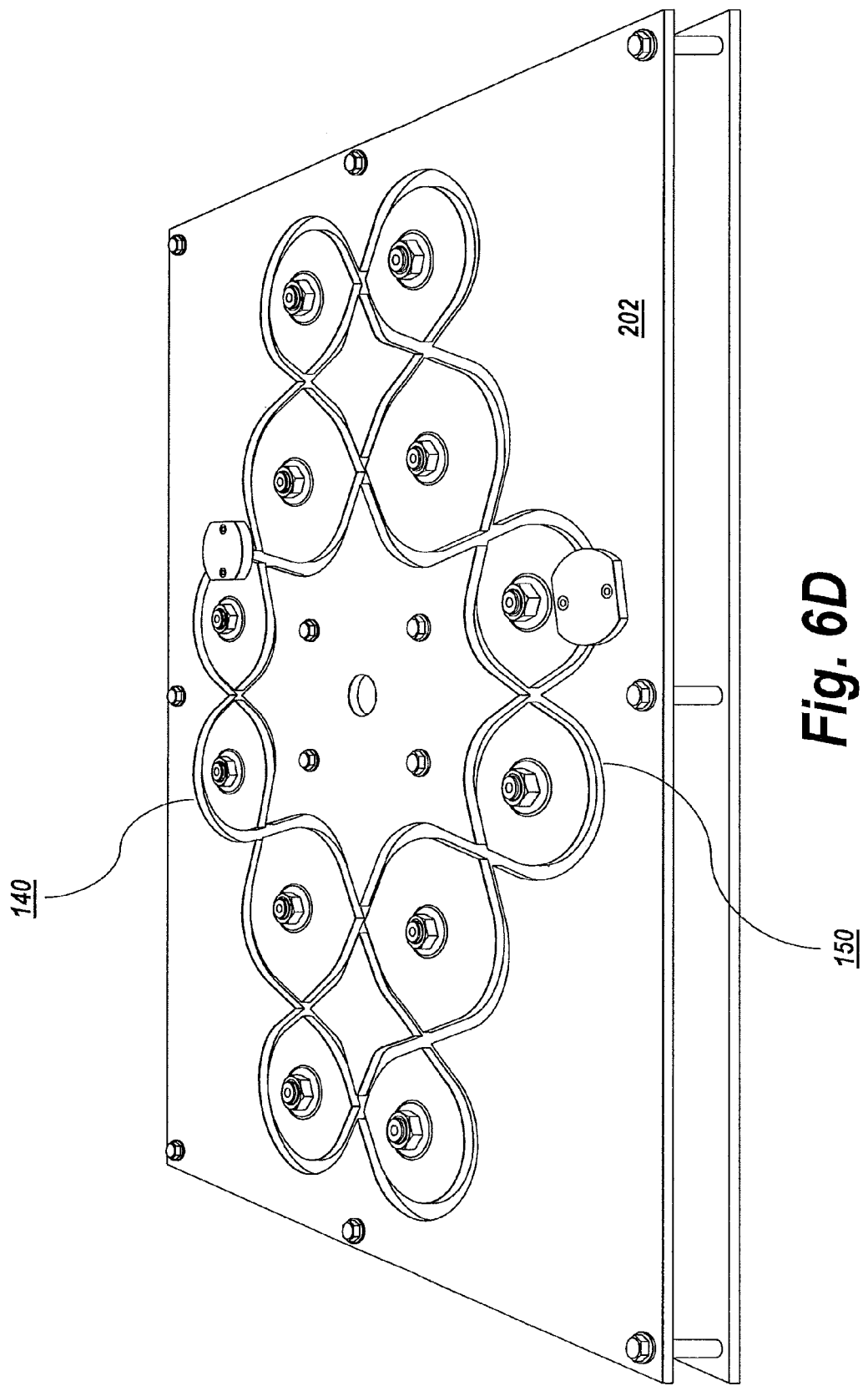
FIG. 6D shows the plate 202 of an apparatus in the configuration of FIG. 6C in more detail.

FIG. 6D shows the plate 202 of the apparatus depicted in FIG. 6C in more detail. In FIG. 6D, a first material path 140 is provided substantially on the upper 50% of the plate, while the second material path 150 is provided substantially on the lower 50% of the plate. The two material paths cross and interconnect on the left and right sides of FIG. 6D.

Underlying the plate 202 of FIG. 6D may be a set of horn gears in the configuration depicted in FIG. 5B.

Using the apparatus 210 and the material paths 160, 170 depicted in FIGS. 5A-6D, a braided dual-sided compression packing 130 may be realized.

It should be noted that FIGS. 5A-6D depict an example employing two material paths, each following a semi-circular pattern and interlocking in two locations. However, it can readily be seen that the apparatus is not limited to two material paths. For example, a third material path could be added which interlocks with the first and second material paths to form a triangular pattern. Such a modification would merely require the addition of another set of gears including interlocking regions substantially corresponding to the configuration already shown in FIGS. 5A-6B. This modification would allow for an braided jacket having three sides each covering substantially 33% of the jacket, rather than two sides each covering substantially 50% of the jacket. Accordingly, three different materials may be used to form the braided jacket, or two materials could be used with a first material covering substantially 33% of the jacket and a second material covering substantially 66% of the jacket. These modifications may be easily extended to provide a four-sided jacket, a five-sided jacket, or a jacket with an arbitrary number of sides.

Furthermore, the Figures of the present application show a square-shaped inner core. However, it should be noted that any core shape may be utilized. For example, in conjunction with the three-sided triangular jacket described above, a triangular core could be employed. This allows the overall compression packing seal to be imparted with a particular shape as defined by the shape of the core.

Figure 7A:
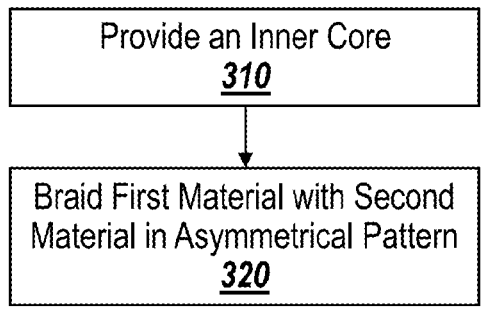
FIG. 7A is a flowchart describing an exemplary method for producing a braided dual-sided jacket.
Figure 7B:
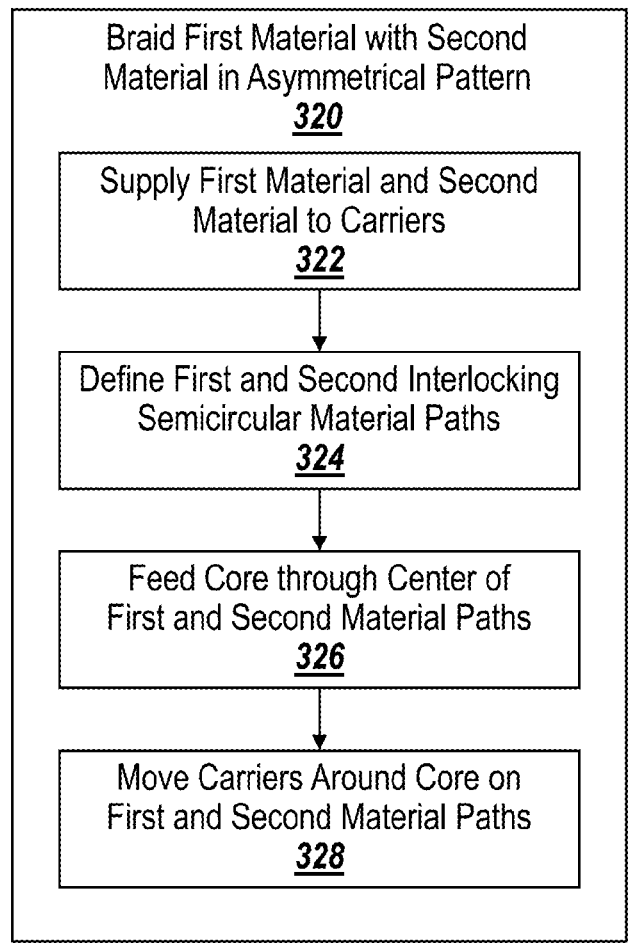
FIG. 7B is a flowchart describing one embodiment for braiding first and second materials of the braided dual-sided jacket.

An exemplary method for producing a braided dual-sided jacket according to an exemplary embodiment is depicted in the flowcharts of FIGS. 7A-7B.

As shown in the flowchart of FIG. 7A, at step 310 an inner core may be provided. The inner core may be, for example, a low-cost material (relative to the first material and/or the second material of the outer jacket). Alternatively, the inner core may be a material or a shape selected based on one or more desired structural characteristics (e.g., providing a certain shape for the overall compression packing seal, such as a triangular or polygonal shape). For example, the inner core may be made up of one or more of acrylic, rayon, fiberglass, carbon, or graphite.

The inner core may be provided to a mechanism for moving the inner core through an apparatus for forming the braided outer jacket of the compression packing seal. For example, the mechanism may be a geared takeoff wheel which pulls the inner core through the jacket as the jacket is braided around the inner core.

At step 320, an outer jacket may be braided around the inner core. For example, a first material and a second material (different from the first material) may be provided to a braiding apparatus, and the braiding apparatus may braid the first material with the second material to form the outer jacket.

The first material may be selected based on one of the following properties of the sealing system: a type of fluid being sealed against, a projected speed of the shaft while in use, a type of abrasive being sealed against in conjunction with the shaft or stuffing box, or a projected pressure on the packing material while in use.

Alternatively or in addition, the first material may exhibit at least one of the following properties: a higher lubricity than the second material, a higher sealability than the second material, a higher extrusion resistance than the second material, or a higher thermal conductivity than the second material Alternatively or in addition, the second material may exhibit at least one of the following properties: a lower cost than the first material, a higher malleability than the first material, a higher modulus than the first material, or less polytetrafluoroethylene (PTFE) content than the first material.

This braiding may be performed in such a manner that the first material and the second material are disposed relative to each other such that, in cross-section, the compression packing seal has an asymmetrical configuration relative to a first axis that is substantially perpendicular to the longitudinal axis and is substantially perpendicular to a side of the compression packing seal.

The first material and the second material may further be braided with each other such that, in cross-section, the compression packing seal has a symmetrical configuration relative to a second axis perpendicular to the first axis. For example, the first material may be disposed substantially completely along one side of the compression packing seal. The first material may form substantially half of surface of the outer jacket of the compression packing seal.

In one embodiment, the braiding may result in a pattern such that the compression packing seal has first and second exterior sides opposed to each other, and the first material is braided to the second material such that the first exterior side is substantially composed of the first material and the second exterior side is substantially composed of the second material.

An example of one embodiment of the braiding operation of step 320 is depicted in FIG. 7B.

At step 322, at least a first material and a second material may be provided to a plurality of carriers. The carriers may be, for example, an element configured to capture and carry the first material or the second material, such as by using a bobbin or the like that attaches the first or second material to the carrier. On an opposed end of the carrier from the capturing element, the carriers may be sized and configured to be held by, and moved between, slots in a series of horn gears.

The carriers may be designed to follow at least two material paths, which may be defined in step 324 by providing two or more tracks in an apparatus. The carriers may be moved through the tracks by the horn gears.

The first material path and the second material path may be substantially semicircular in shape. The first material path may carry the first material, while the second material path may carry the second material. The material paths may define the outer surface area of the compression packing seal, such that the compression packing seal exposes a first exterior side of the first material and a second exterior side of the second material.

At step 326, the core may be fed through the center of the first and second material paths. For example, the core may be attached to a takeoff wheel, and the takeoff wheel may move the core through the first and second material paths.

At step 328, the horn gears may move the carriers around the core on the first and second material paths. The horn gears may be sized and configured so that the carriers do not collide with each other as they move along the material paths. As a result, the carriers may interlock the first material with the second material along the at least two material paths around the inner core to form the compression packing seal.

Figure 8:
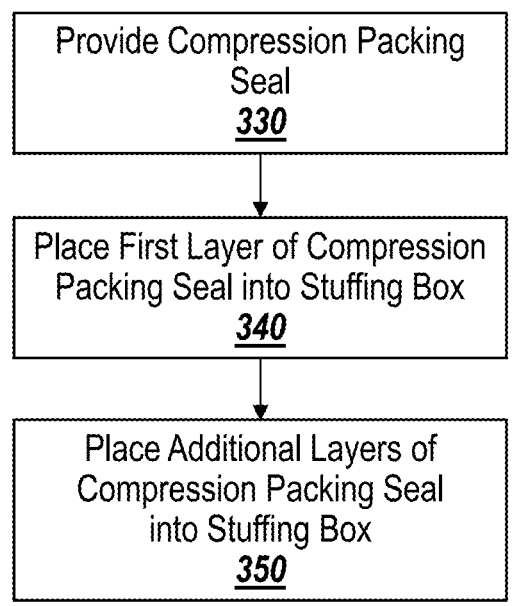
FIG. 8 is a flowchart describing an exemplary method for using the exemplary braided dual-sided jacket in a stuffing box.

Once the compression packing seal is created, it may be employed in a number of scenarios. FIG. 8 depicts a flowchart describing one exemplary method for employing the compression packing seal in a stuffing box.

At step 330, the compression packing seal may be provided. The compression packing seal may be created, for example, according to the method shown in FIGS. 7A and 7B.

At step 340, a first layer of compression packing seal material may be placed in a stuffing box. The stuffing box may be provided around a shaft, and the first layer of compression packing seal may be wrapped around a shaft with the stuffing box (eventually) secured over the compression packing seal.

The first layer of the compression packing seal may include a first material and a second material braided together, and the first material may be positioned so as to face the shaft, while the second material may be positioned so as to face outwards against a radially interior wall of the stuffing box.

Optionally, at step 350 additional layers of the compression packing seal may be placed into the stuffing box in a different configuration than the first layer (e.g., with the first material facing the radially interior wall of the stuffing box and the second material facing the shaft, or rotated 90 degrees so that half of each of the first material and the second material face both the shaft and the radially interior wall of the stuffing box). Alternatively or in addition, the additional layers may employ different types of material than the first layer, such as a third material and a fourth material distinct from the first and second materials.

In some embodiments, the stuffing box may be provided with a lantern ring. The layer of compression packing seal placed at step 340 may be a first compression packing seal provided between the lantern ring and a fluid to be sealed. The second layer of compression packing seal placed at step 350 may be positioned on the opposite side of the lantern ring from the first compression packing seal. In such an embodiment, the first layer of compression packing seal may exhibit at least one of the following properties: higher lubricity than the second compression packing seal, higher thermal conductivity than the second compression packing seal, or higher sealability than the second compression packing seal. Alternatively or in addition, the second layer of the compression packing seal may exhibit at least one of the following properties: higher strength than the first compression packing seal, or greater abrasion resistance than the first compression packing seal. In some embodiments, the first layer of the compression packing seal may have substantially the same construction as the second layer of the compression packing seal and may be provided in the stuffing box in a different configuration than the second layer of the compression packing seal.

In yet another embodiment, the first layer of the compression packing seal placed at step 340 may be provided on at least one longitudinal end of the stuffing box, and the first layer of the compression packing seal may exhibit at least one of the following properties: higher strength than the second compression packing seal, a greater sealing surface speed capability than the second compression packing seal, or greater sealability than the second compression packing seal. In another example, the layer closest to a longitudinally exterior position in the stuffing box may be provided in a different configuration than a layer in a longitudinally interior position in the stuffing box.

In view of the above, it will be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A braided dual-sided compression packing seal, wherein a longitudinal axis extends through the center of the compression packing seal along a length of the compression packing seal, the compression packing seal comprising:

an inner core; and an outer jacket, the outer jacket comprising at least a first material and a second material different than the first material, wherein the first material is braided with the second material to form the outer jacket and wherein the first material and the second material are disposed relative to each other such that, in cross-section, the compression packing seal has an asymmetrical configuration relative to a first axis that is substantially perpendicular to the longitudinal axis and is substantially perpendicular to a side of the compression packing seal, wherein, as a result of the braiding and when viewed in cross-section, the first material of the outer jacket is disposed substantially completely along one side of the compression packing seal and the second material of the outer jacket is disposed substantially completely along the other side of the compression packing seal.

2. The compression packing seal of claim 1, wherein the inner core comprises acrylic, rayon, fiberglass, carbon, or graphite.

3. The compression packing seal of claim 1, wherein the compression packing seal has a plurality of sides, and the compression packing seal presents an asymmetrical configuration when viewed in a plane that is perpendicular to the sides.

4. The compression packing seal of claim 1, wherein the first material and the second material are further disposed relative to each other such that, in cross-section, the compression packing seal has a symmetrical configuration relative to a second axis perpendicular to the first axis.

5. The compression packing seal of claim 1, wherein the first material comprises carbon, polytetrafluoroethylene (PTFE), a para-aramid synthetic fiber, polybenzimidazole fiber (PBI), or 95%+carbon.

6. The compression packing seal of claim 1, wherein the second material comprises acrylic, rayon, fiberglass, carbon, or graphite.

7. The compression packing seal of claim 1, wherein the first material and the second material have different properties.

8. The compression packing seal of claim 1, wherein the first material has at least one of a higher lubricity than the second material, a higher sealability than the second material, a different construction than the second material, a higher extrusion resistance than the second material, or a higher thermal conductivity than the second material.

9. The compression packing seal of claim 1, wherein the second material has at least one of a lower cost than the first material, a higher malleability than the first material, a higher modulus than the first material, or less PTFE content than the first material.

10. The compression packing seal of claim 1, wherein the core is a square braid, a square interbraid, or an extruded core.

11. The compression packing seal of claim 1, wherein the core is of a square shape when viewed in cross-section.

12. The compression packing seal of claim 1, wherein the core is of a circular shape when viewed in cross-section.

13. The compression packing seal of claim 1, wherein the core is of a polygonal shape when viewed in cross-section.

14. The compression packing seal of claim 1, wherein one or more of the first and second materials, when viewed in cross-section, are interlaced around the inner core in a round-braided shape.

15. A method of packing a stuffing box substantially surrounding a shaft to form a sealing system, the method comprising:

providing a compression packing seal according to claim 1; and placing the compression packing seal in the stuffing box.

16. The method of claim 15, wherein the compression packing seal is placed in the stuffing box so that the first material faces the shaft and the second material faces outwards against a radially interior wall of a the stuffing box.

17. The method of claim 16, wherein the first material is selected based on one of the following properties of the sealing system: a type of fluid being sealed against, a projected speed of the shaft while in use, a type of abrasive being sealed against in conjunction with the shaft or stuffing box, or a projected pressure on the packing material while in use.

18. The method of claim 16, wherein the first material exhibits at least one of the following properties: a higher lubricity than the second material, a higher sealability than the second material, a higher extrusion resistance than the second material, or a higher thermal conductivity than the second material.

19. The method of claim 16, wherein the second material exhibits at least one of the following properties: a lower cost than the first material, a higher malleability than the first material, a higher modulus than the first material, or less polytetrafluoroethylene (PTFE) content than the first material.

20. The method of claim 15, wherein the stuffing box further comprises a lantern ring and the compression packing seal is a first compression packing seal provided between the lantern ring and a fluid to be sealed, and further comprising:

providing a second compression packing seal according to claim 1 on the opposite side of the lantern ring from the first compression packing seal, wherein the second compression packing seal exhibits at least one of the following properties: higher lubricity than the first compression packing seal, higher thermal conductivity than the first compression packing seal, or higher sealability than the first compression packing seal; or the first compression packing seal exhibits at least one of the following properties: higher strength than the second compression packing seal, or greater abrasion resistance than the second compression packing seal.

21. The method of claim 15, wherein the stuffing box further comprises a lantern ring and the compression packing seal is a first compression packing seal provided between the lantern ring and a fluid to be sealed, and further comprising:

providing a second compression packing seal according to claim 1 on the opposite side of the lantern ring from the first compression packing seal, wherein the first compression packing seal has substantially the same construction as the second compression packing seal and is provided in the stuffing box in a different configuration than the second compression packing seal.

22. The method of claim 15, wherein the compression packing seal is a first compression packing seal, further comprising:

providing a second compression packing seal according to claim 1, wherein:

the first compression packing seal is provided on at least one longitudinal end of the stuffing box, and the first compression packing seal exhibits at least one of the following properties: higher strength than the second compression packing seal, a greater sealing surface speed capability than the second compression packing seal, or greater sealability than the second compression packing seal.

23. The method of claim 15, wherein the compression packing seal is provided in multiple layers around the shaft, and a layer closest to a longitudinally exterior position in the stuffing box is provided in a different configuration than a layer in a longitudinally interior position in the stuffing box.

* * * * *